United States Patent
Li (10) Patent No.: US 10,805,570 B2
(45) Date of Patent: Oct. 13, 2020

(54) SYSTEM AND METHOD FOR STREAMING MULTIMEDIA DATA

(71) Applicant: Alibaba Group Holding Limited, George Town (KY)

(72) Inventor: Jiangwei Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 135 days.

(21) Appl. No.: 16/047,431

(22) Filed: Jul. 27, 2018

(65) Prior Publication Data
US 2019/0028668 A1    Jan. 24, 2019

Related U.S. Application Data

(63) Continuation-in-part of application No. PCT/CN2017/071819, filed on Jan. 20, 2017.

(30) Foreign Application Priority Data

Feb. 1, 2016   (CN) .......................... 2016 1 0069362

(51) Int. Cl.
| | |
|---|---|
| *H04N 5/445* | (2011.01) |
| *H04N 21/431* | (2011.01) |
| *H04N 21/44* | (2011.01) |
| *H04N 21/443* | (2011.01) |
| *H04N 19/172* | (2014.01) |
| *G06F 9/54* | (2006.01) |
| *H04N 5/45* | (2011.01) |
| *H04N 19/44* | (2014.01) |

(52) U.S. Cl.
CPC ......... *H04N 5/44591* (2013.01); *G06F 9/542* (2013.01); *H04N 5/45* (2013.01); *H04N 19/172* (2014.11); *H04N 21/431* (2013.01); *H04N 21/4312* (2013.01); *H04N 21/44* (2013.01); *H04N 21/4438* (2013.01); *H04N 19/44* (2014.11)

(58) Field of Classification Search
CPC ....... G06F 9/451; G06F 9/542; H04N 19/172; H04N 19/44; H04N 21/431; H04N 21/4312; H04N 21/44; H04N 21/4438; H04N 5/44591; H04N 5/45
USPC .................................................. 375/240.28
See application file for complete search history.

(56) References Cited

U.S. PATENT DOCUMENTS

| | | | |
|---|---|---|---|
| 6,658,056 | B1 | 12/2003 | Duruöz |
| 7,885,338 | B1 | 2/2011 | Bushell |
| 8,724,029 | B2 | 5/2014 | Uro |

(Continued)

FOREIGN PATENT DOCUMENTS

| | | |
|---|---|---|
| CN | 101937416 | 1/2011 |
| CN | 102739983 | 10/2012 |

(Continued)

*Primary Examiner* — James T Boylan
(74) *Attorney, Agent, or Firm* — Van Pelt, Yi & James LLP (57) ABSTRACT

A method for processing multimedia data is disclose, including: determining whether at least one frame associated with the multimedia data has been decoded; in response to the determination that the at least one frame associated with the multimedia data has been decoded, drawing a transparent area on a display interface; and instructing a multimedia data playing window and the at least one frame associated with the multimedia data to be drawn, wherein the transparent area and the multimedia data playing window overlap at different drawing layers.

20 Claims, 7 Drawing Sheets

(56) References Cited

U.S. PATENT DOCUMENTS

| | | |
|---|---|---|
| 2004/0042553 A1 | 3/2004 | Elbaz |
| 2013/0129324 A1 | 5/2013 | Uro |
| 2014/0003516 A1 | 1/2014 | Soroushian |
| 2015/0026719 A1* | 1/2015 | Menon ............... H04N 21/2668 725/34 |
| 2016/0119648 A1* | 4/2016 | Yamamura ............. H04N 19/65 382/233 |

FOREIGN PATENT DOCUMENTS

| | | | |
|---|---|---|---|
| CN | 102739983 A | * | 10/2012 |
| CN | 104407865 | | 3/2015 |

* cited by examiner

SYSTEM AND METHOD FOR STREAMING MULTIMEDIA DATA

CROSS REFERENCE TO OTHER APPLICATIONS

This application is a continuation-in-part of and claims priority to International (PCT) Application No. PCT/CN2017/071819 entitled RENDERING METHOD, DECODING METHOD, AND METHOD AND DEVICE FOR PLAYING MULTIMEDIA DATA STREAM filed Jan. 20, 2017 which is incorporated herein by reference for all purposes, which claims priority to People's Republic of China Patent Application No. 201610069362.5 entitled RENDERING METHOD, DECODING METHOD, AND MULTIMEDIA DATA STREAM PLAYING METHOD AND MEANS filed Feb. 1, 2016 which is incorporated herein by reference for all purposes.

FIELD OF THE INVENTION

The present application relates generally to the field of multimedia data streaming and more particularly, to processing and presentation of multimedia data.

BACKGROUND OF THE INVENTION

Digital content capabilities such as video and audio capabilities have been incorporated into a variety of devices, including smart phones, tablet computers, laptop computers, personal computers, digital televisions (e.g., IPTV), digital cameras, digital media players, gaming consoles, video-conferencing devices, and the like. Generally, digital audio data is compressed using techniques such as MP3, Opus, or the like; while digital video data is compressed, using techniques such as standards defined in MP4, MPEG-2, MPEG-4, H.264, High Efficiency Video Coding (HEVC) standards and extensions thereof. Multimedia content is compressed for transmission and/or storage. Typically, multimedia data is transmitted over a network using transport protocols such as Real Time Streaming Protocol (RTSP), Real-time Transport Protocol (RTP), Dynamic Adaptive Streaming over HTTP (DASH), HTTP Live Streaming (HLS), and the like.

Taking video content for example, oftentimes a streaming client is installed at a user device to receive (e.g., one-way streaming) and/or interact with (e.g., two-way multimedia streaming) the video content streamed from a multimedia service (e.g., Apple music). When a multimedia data stream is played at a device, typically an area on a display interface at the device serves as a presenting area for multimedia data streams. According to conventional techniques, a transparent area at a drawing layer for the display interface is drawn first, then a player window is separately drawn at a different drawing layer, with the player window overlapping the transparent area. The player window is configured to display the decoded frames associated with the multimedia data to be played.

Generally, a client side frame buffer is required to be loaded in order to prevent data loss and/or degradation during the streaming process. However, at the startup of the streaming of multimedia data, decoded frames take time to be added to the frame buffer and may therefore cause a temporary delay in supplying the decoded multimedia frames for displaying. As a result, a distorted screen is presented to a user at the startup of the streaming.

Therefore, there exists a need for improved techniques for processing and presenting multimedia content to users.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for processing and displaying multimedia data are described herein. The timing of when to draw a transparent area on a display interface, when to draw a player window for playing multimedia data, and when to play the decoded frames associated with the multimedia data in the player window are controlled in order to prevent the above-described distorted screen effects. Notifying capability is provided to a decoding service such that a notification is generated when at least one frame associated with multimedia data is decoded. On the one hand, the knowledge regarding the status and progress of decoding multimedia data is utilized towards solving the problem of distorted or scrambled screens. On the other hand, a rendering service is configured to control the timing of when to draw a transparent area as well as when to draw a player window. As such, when the transparent area is drawn on a display interface, it is guaranteed that at least one frame associated with the multimedia data has been decoded and is ready for being rendered. Because there is at least one decoded frame for displaying at the startup of playing multimedia data, the problem associated with displaying a scrambled screen is eliminated.

Figure 1:
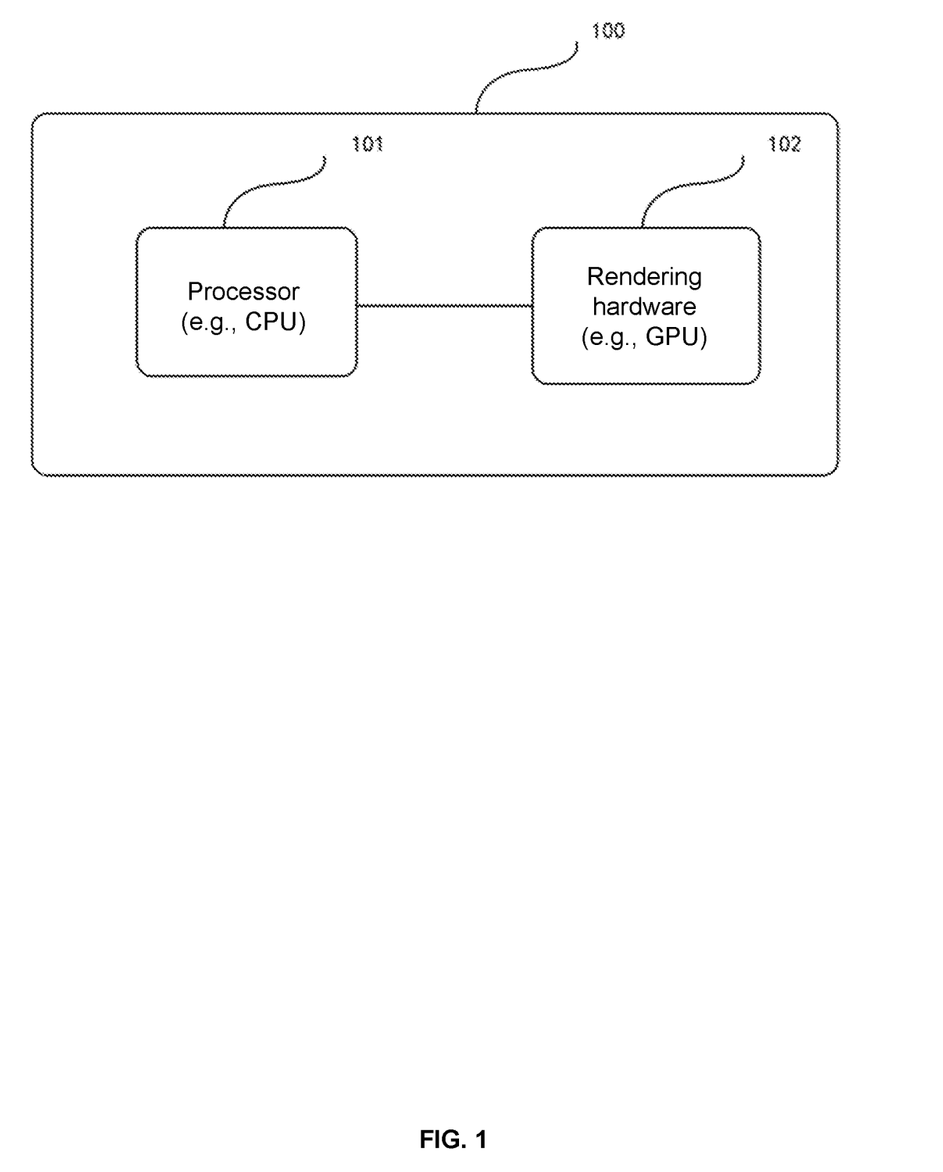
FIG. 1 is a schematic diagram illustrating a portion of an example device for processing and displaying multimedia data, in accordance with one or more embodiments of the present disclosure.

FIG. 1 illustrates a schematic diagram of a portion of an example device for processing and displaying multimedia data in accordance with an embodiment of the present disclosure. Device 100 can be implemented by, for example, system 600 of FIG. 6.

Device 100 includes a processor 101, a network interface (not shown), and rendering hardware 102. Processor 101 can include, for example, a microprocessor, microcontroller, and the like. As shown herein, process 101 is implemented as a central processing unit (CPU), which can include one or more CPU cores. The network interface is configured to enable communication between device 100 and content server (e.g., a streaming source provider) over a network. As shown herein, rendering hardware 102 is implemented at a graphics processing unit (GPU) separate from processor 101. In some embodiments, rendering hardware 102 can be implemented as part of processor 101. In this example, rendering hardware 102 (e.g., GPU) can be connected to processor 101 (e.g., CPU) using the PCI-Express bus, PCI bus, AGP bus, or the like. Typically, GPU has on-board memory (e.g., video RAM) (not shown), which can be used to store the data or a portion of the data to be rendered. Also, the rendering results are stored in the on-board memory and once finished can be transferred into a memory (not shown) of device 100.

For purposes of simplicity, only one processor 101 and one rendering hardware 102 are illustrated. It should be understood that device 100 can include any number of processor 101 as well as any number of rendering hardware 102, without limitation. It should also be understood that device 100 can include other components as well, such as memory, a chipset, etc., which are not illustrated in FIG. 1.

Further, device 100 is configured with an operating system (not shown), which is configured to either include or host a variety of services (e.g., applications) such as multimedia client endpoint players, browsers, virtual desktops, and the like.

According to various embodiments of the present disclosure, device 100 can be a single device, a component of a device, a composite device having multiple components, or the like. For example, a terminal device can include a mobile phone, a computer, a smart household device, a wearable device, a smart medical device, an in-vehicle device, a TV device, an Internet of Things (IoT) device etc. A mobile phone device can include, for example, a smart phone. A computer device can include, for example, a server computer, a personal computer, a notebook computer, a tablet computer, and the like. A smart household device can include, for example, a smart television set, a smart home security system, and the like. A wearable device can include, for example, a smart watch, a pair of smart glasses, a smart wrist-band, smart accessories, and the like. A smart medical device can include, for example, a smart blood pressure gauge, a smart bodyweight scale, and the like. An in-vehicle device can include, for example, a smart on-board information system for traffic information, cellular communication, vehicle diagnosis, navigation system, warning system, emergency system, entertainment system, and the like. A TV device can include, for example, an IPTV client device, a Video On-demand client device, and the like. In particular, device 100 can include a processing device, such as a content preparation device, equipped with wired (e.g., LAN, WAN) or wireless (e.g., Wi-Fi) communication capabilities. For example, such a processing device can be configured to connect to a communication network via a wireless modem.

Rendering hardware 102 is configured to render interface elements associated with an interface for displaying to a user of device 100. It is through the rendering process that various interface elements are organized at an interface according to the respective layout designs. For example, a user interface displayed during the execution of a browser, a desktop interface displayed during the execution of an operating system, an application user interface displayed at a portion of a desktop interface of an operating system, are all generated based on the rendering results of one or more GPU rendering the data to be displayed.

In this example, processor 101 is coupled to rendering hardware 102 (e.g., a CPU is coupled to a GPU). The operating system is configured to execute on processor 101. Applications are configured to transmit data to be displayed to rendering hardware 102 by invoking corresponding interfaces provided the operating system. In turn, rendering hardware 102 is configured to render the received data to be displayed, and store the rendering results thereof at storages such as a Video RAM (VRAM).

In some embodiments, a rendering service is configured to use rendering hardware 102 to perform rendering tasks. For example, a rendering service can utilize a GPU for rendering the data to be displayed. In some embodiments, a rendering service is implemented as a module which is part of an application. In some embodiments, a rendering service is implemented as a module provided by the operating system, or a third party provider in the form of, for example, a plug-in. A rendering service can be configured to generate a drawing layer at VRAM, which is the medium for drawing interface elements to be displayed. The drawing results (e.g., rendering results) of interface elements are obtained from such drawing layer for displaying by, for example, a display service provided by the operating system.

In some embodiments, in order to display multimedia data (e.g., a multimedia stream), the rendering of interface elements associated with the display interface at which the multimedia data is displayed includes configuring a transparent area in a drawing layer. In this case, the transparent area is configured as a placeholder that defines the placement of multimedia content at the display interface. Thus, when another view (e.g., the player window) is set on the placeholder, the multimedia content drawn in the view is displayed accordingly. Also, a multimedia playing service is configured to draw a player window for displaying the multimedia data (e.g., a multimedia data playing window) at a different drawing layer. The multimedia playing service is also configured to display each frame associated with the multimedia data at the player window. In some embodiments, the transparent area and the player window are overlapping. In some embodiments, the transparent area and the player window overlap in a superimposing manner. In some embodiments, the transparent area and the player window overlap in a substantially superimposing manner.

A display interface includes, for example, an application user interface, a desktop of an operating system, and the like. Multimedia data includes, for example, video data, audio data, 3D animation data, gaming data, and the like. Multimedia data can be transmitted in the form of streams over a network, or stored as media file at a device. For purposes of simplicity, multimedia data streams are used as example to illustrates various embodiments of the present disclosure. It should be understood that embodiments of the present disclosure can be applicable to any form of multimedia data, without limitation.

Figure 2A:
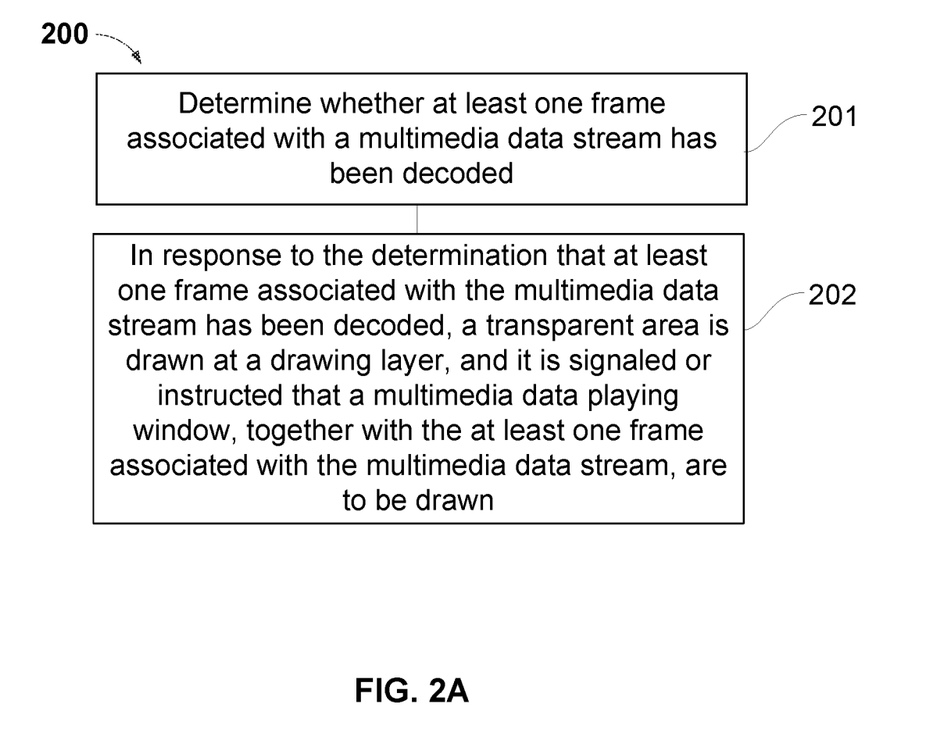
FIG. 2A is a flow chart illustrating an example process for rendering multimedia data, in accordance with one or more embodiments of the present disclosure.

FIG. 2A illustrates a flow chart of an example process for rendering multimedia data in accordance with an embodiment of the present disclosure. Process 200 can be executed by, for example, an above-described rendering service. Process 200 can be implemented at, for example, device 100 of FIG. 1, or system 600 of FIG. 6.

Process 200 starts at 201, where it is determined whether at least one frame associated with multimedia data stream has been decoded.

At 202, in response to the determination that at least one frame associated with the multimedia data stream has been decoded, a transparent area is drawn at a drawing layer. Further, it is signaled or instructed that a multimedia playing window for displaying the multimedia data stream, together with the at least one frame associated with the multimedia data stream, are to be drawn.

As the multimedia data has been encoded according to the afore-mentioned various encoding standards for transmission or storage, the multimedia data stream has to be decoded into video frames before being rendered for display. In some embodiments, the decoding can be performed by, for example, a decoder configured with the multimedia data playing service, or a decoder embedded in the operating system, or a decoding service provided by a third party.

In some embodiments, the at least one frame associated with the multimedia data stream is a first frame to be displayed at the startup of the streaming multimedia data at the player window. In some embodiments, according to various playing commands from a user to display one or more frames other than the first frame associated with the multimedia data stream, the other one or more frames can be designated as the at least one frame for rendering.

In some embodiments, the at least one frame associated with the multimedia data stream includes a plurality of decoded frames associated with the multimedia data stream. For example, the at least one frame associated with the multimedia data stream can include three (3) or five (5) decoded frames. In some embodiments, the number of decoded frames included in the at least one frame associated with the multimedia data stream is dynamically configured based on the context or circumstances of an application. For example, for a device running low in battery or memory, or a device with a low bandwidth connection over a network to the multimedia streaming server, the number of decoded frames can be configured as a relatively small number such as one or two. In contrast, for a device having ample runtime computing resources, or a device with broadband connection over a network to a multimedia streaming server, the number of decoded frames can be configured as a relatively large number. In some embodiments, the number of decoded frames can be dynamically adjusted based on real time context and circumstances.

Compared to the conventional techniques, the timing with which the drawing of a transparent area and a player window is guaranteed to be subsequent to the at least first frame associated with the multimedia data stream being decoded. On the contrary, the conventional techniques do not take into account of whether the first frame for displaying has been decoded, therefore configuring a transparent area once a rendering service is able to compute the size and location for the transparent area.

In some embodiments, when it is determined that at least one frame associated with the multimedia data stream has been decoded and after completing the drawing of a transparent area, a rendering service is configured to signal or instruct a displaying service to draw a player window (e.g., a multimedia data playing window). In some embodiments, the rendering service is configured to notify the display service to drawn the player window once it is determined that at least one frame associated with the multimedia data stream has been decoded. Upon receiving the notification, the displaying service can be configured to start drawing the player window immediately, or when other conditions are also met. Thus, the drawing of the transparent area and the player window can be performed at substantially the same time, or in a sequential order.

Figure 2B:
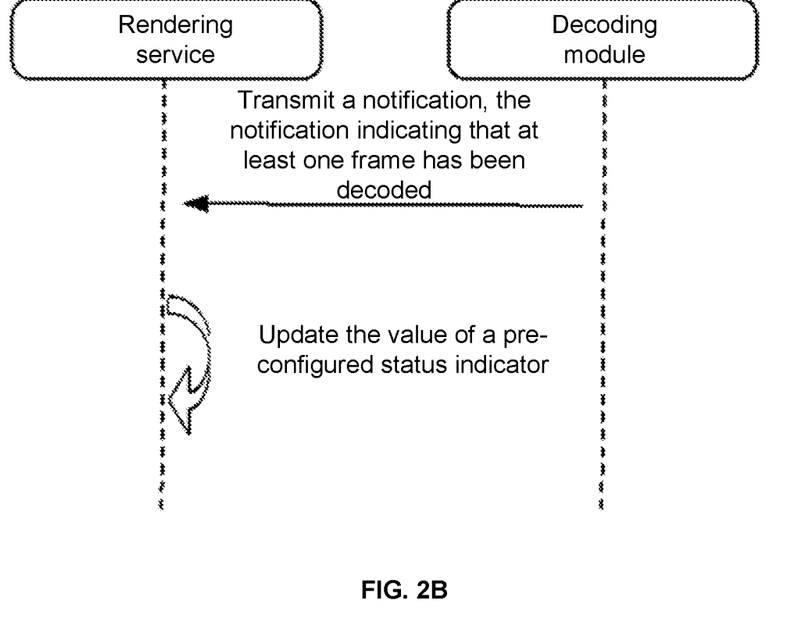
FIGS. 2B-2C are interactive diagrams illustrating two example processes for processing multimedia data, in accordance with one or more embodiments of the present disclosure.

FIG. 2B illustrates an interactive diagram of an example process for determining whether at least one frame associated with the multimedia data stream has been decoded in accordance with an embodiment of the present disclosure. In this example, a decoding service (e.g., a decoding module) is configured to transmit a notification to a rendering service after decoding at least one frame. The rendering service is configured to monitor for notifications from the decoding service by use of, for example, a monitoring thread. Further, a status indicator is configured to indicate whether at least one frame associated with the multimedia data stream has been decoded. The status indicator is pre-configured with an initial value indicating that the first frame has not been decoded. Here, the rendering service is configured to determine whether at least one frame associated with the multimedia data stream has been decoded based on the value of the status indicator by use of, for example, a determining thread. For example, when the determining thread detects that the status indicator has remained at its initial value, it is determined that the first frame has not been decoded. However, upon receiving the above-described notification from the decoding service that the value of the status indicator is updated to a value different than the initial one to indicate that at least one frame has been decoded. For example, a value of 0 can be assigned as the initial value to indicate that the first frame has not been decoded; while a value of 1 can be assigned as the updated value to indicate that at least one frame has been decoded. For another example, a binary value of "true" and "false" can assigned to the status indicator to distinguish between those two states.

Figure 2C:
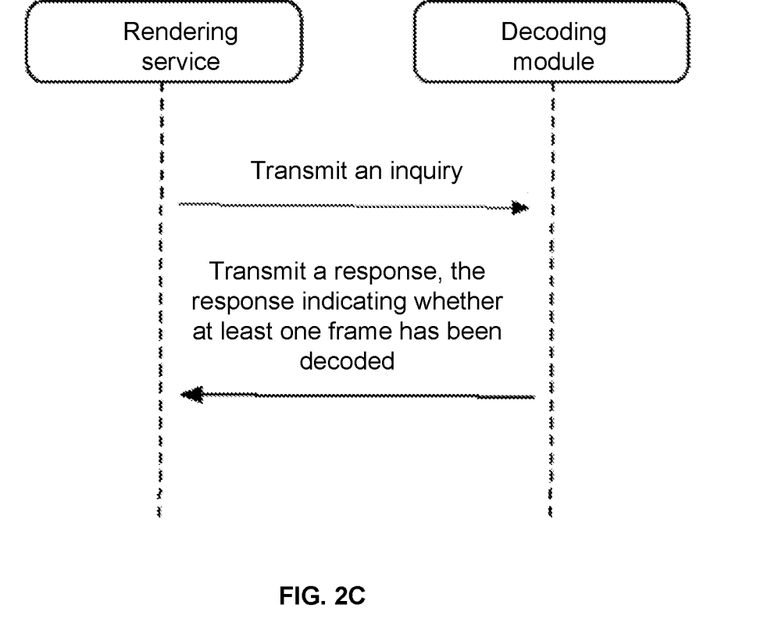

FIG. 2C illustrates an interactive diagram of another example process for determining whether at least one frame associated with the multimedia data stream has been decoded in accordance with an embodiment of the present disclosure. In this example, the rendering service is configured to actively initiate an inquiry about whether at least one frame associated with the multimedia data stream has been decoded to a decoding service (e.g., a decoding module). Upon receiving the inquiry, the decoding service is configured to transmit a response to the rendering service based on whether at least one frame associated with the multimedia data stream has been decoded. Upon receiving the response, the rendering service is configured to determine whether at least one frame associated with the multimedia data stream has been decoded based on the received response.

Returning to the process described in FIG. 2A, at 201, if is determined that at least one frame associated with the multimedia data stream has been decoded, at 202 it is signaled for a transparent area, and a player window for playing the multimedia data stream (e.g., a multimedia data playing window) to be drawn. It should be understood that any suitable technique can be applied herein to the drawing without limitation. For example, after determining that at least one frame associated with the multimedia data stream has been decoded, the rendering service is configured to notify a GPU process (e.g., a GPU process started by the operating system when the GPU is used for rendering) and a multimedia playing service. The notification for the GPU process is configured to notify a corresponding drawing module of the rendering service to draw the transparent area. The notification for the multimedia playing service is configured to notify a corresponding drawing module to draw the player window as well as at least one frame associated with the multimedia data stream.

In some embodiments, at 201, if it is determined that there has not been at least one decoded frame associated with the multimedia data stream, prior to 202, a drawing module of the rendering service can be notified to draw pre-configured content (e.g., an image) on the drawing layer. Such pre-configured content can be determined according to various designs to include content such as a poster related to the multimedia data stream to be played, advertisements related to the multimedia data stream to be played, and the like.

In order to cooperate with a rendering engine's drawing process, a decoder is improved with functionalities to provide notifications regarding whether at least one frame has been decoded. In some embodiments, the notification can be transmitted via, for example, an expansion interface to the rendering process (e.g., rendering engine). In some embodiments, an expansion interface includes an interface implemented over a PCI Express bus.

Figure 3:
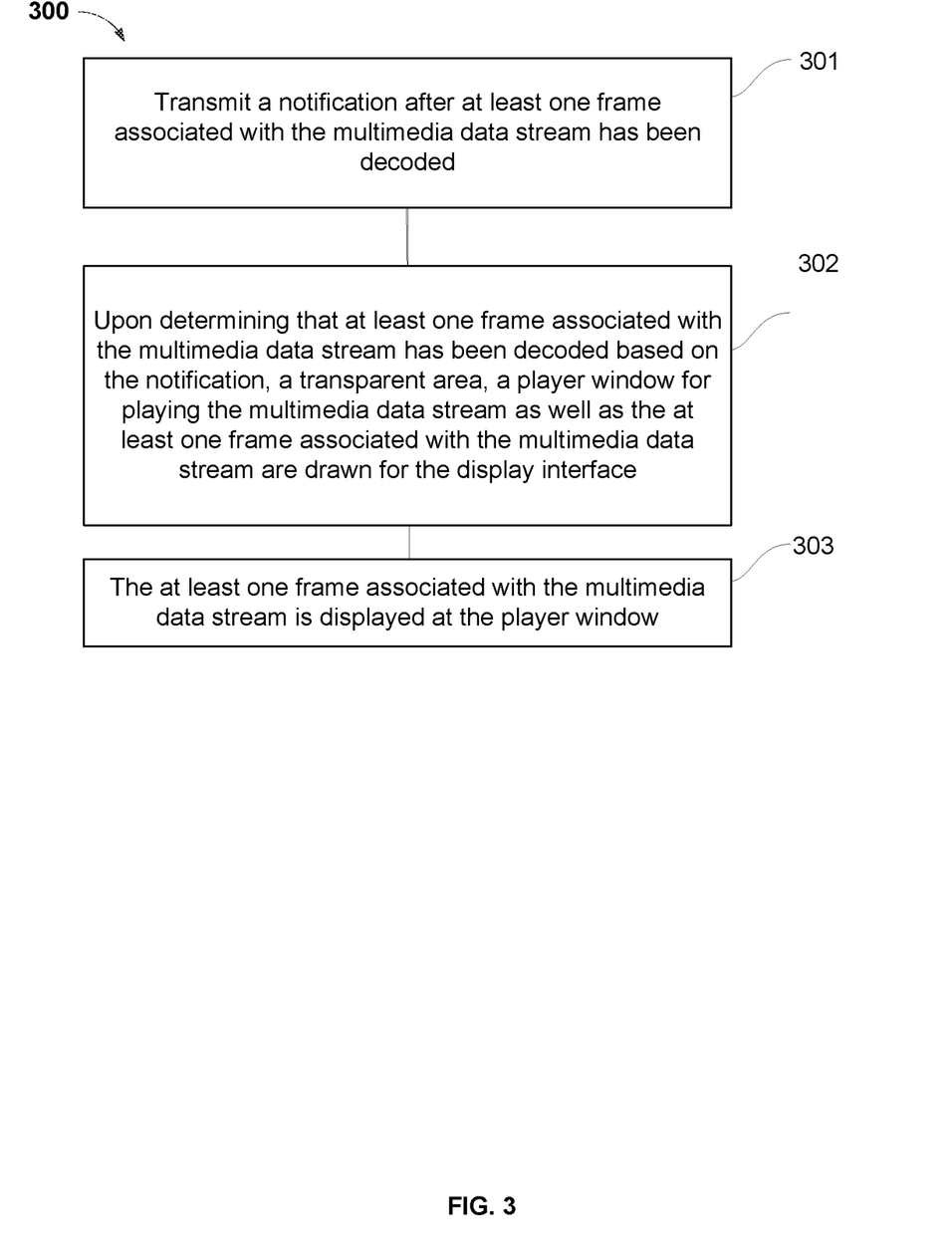
FIG. 3 is a flow chart illustrating an example process for displaying multimedia data, in accordance with one or more embodiments of the present disclosure.

FIG. 3 illustrates a flow chart of an example process for displaying multimedia data in accordance with an embodiment of the present disclosure. In this example, the multimedia data is displayed at a display interface rendered by process 200 of FIG. 2. Process 300 can be implemented at, for example, device 100 of FIG. 1, or system 600 of FIG. 6. Process 300 includes stages of decoding multimedia data stream, rendering the data to be displayed, and displaying the rendering results. As most aspects are substantially similar to that described with reference to FIGS. 2A-2C, for purposes of simplicity, the details are not repeated herein.

Process 300 starts at 301, where a notification is transmitted after at least one frame associated with the multimedia data stream has been decoded.

At 302, upon determining that at least one frame associated with the multimedia data stream has been decoded based on the notification, a transparent area, a player window for playing the multimedia data stream (e.g., a multimedia data playing window) as well as the at least one frame associated with the multimedia data stream are drawn for the display interface. In some embodiments, the transparent area and the player window are drawn at different drawing layers in an overlapping manner.

At 303, the at least one frame associated with the multimedia data stream is displayed at the player window.

In some embodiments, step 301 is performed during the stage of decoding the multimedia data stream by a decoding service. Step 302 is performed during the stage of rendering the multimedia stream data to be displayed. A rendering service can be configured to determine whether at least one frame associated with the multimedia data stream has been decoded, based on which a transparent area on the display interface is drawn. On the other hand, the rendering service is also configured to notify the displaying service to draw a player window and at least one frame in the player window. At 303, after the player window and the transparent area have been drawn, the displaying service is notified to display the rendering results thereof. At the same time, the displaying service is further notified to obtain the at least one decoded frame associated with the multimedia data stream and to display the obtained frame in the player window.

In some embodiments, when the rendering service determines that there has not been at least one decoded frame associated with the multimedia data stream, prior to 302, a drawing module of the rendering service can be notified to draw pre-configured content (e.g., an image) on the drawing layer. Such pre-configured content can be determined according to various designs to include content such as a poster related to the multimedia data stream to be played, advertisements related to the multimedia data stream to be played, and the like. Once the drawing of the pre-configured content is complete, similarly the displaying service is notified to display the rendered interface, which displays the pre-configured content instead of the multimedia data stream. As such, before being able to view the requested multimedia data stream, a user is presented with pre-configured content instead of a black screen, an empty screen, a dithering screen, a scrambled screen, etc. Therefore, user experience with streaming multimedia data is improved.

Figure 4A:
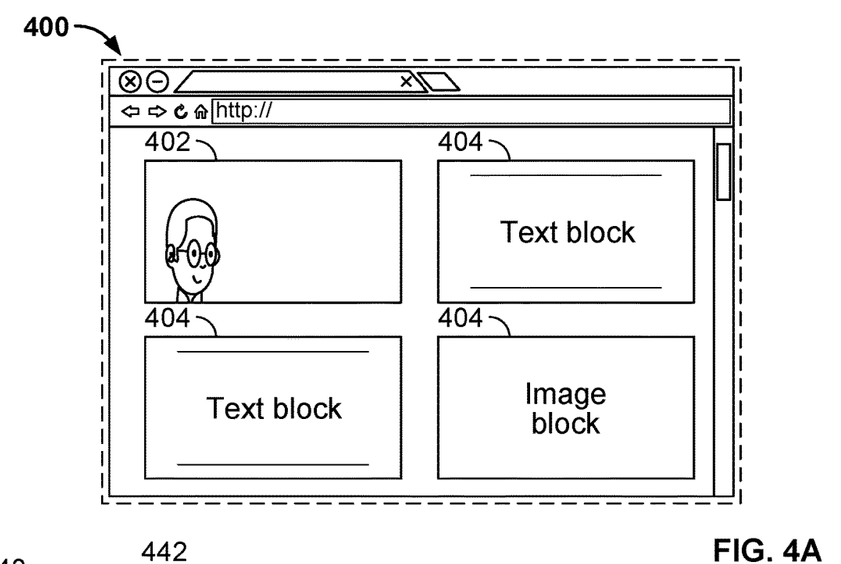
FIGS. 4A-4C are schematic diagrams illustrating example display interfaces for displaying multimedia data, in accordance with one or more embodiments of the present disclosure.
Figure 4B:
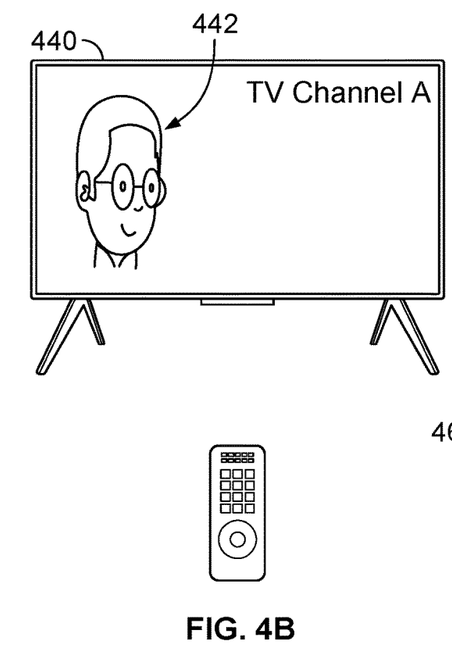
Figure 4C:
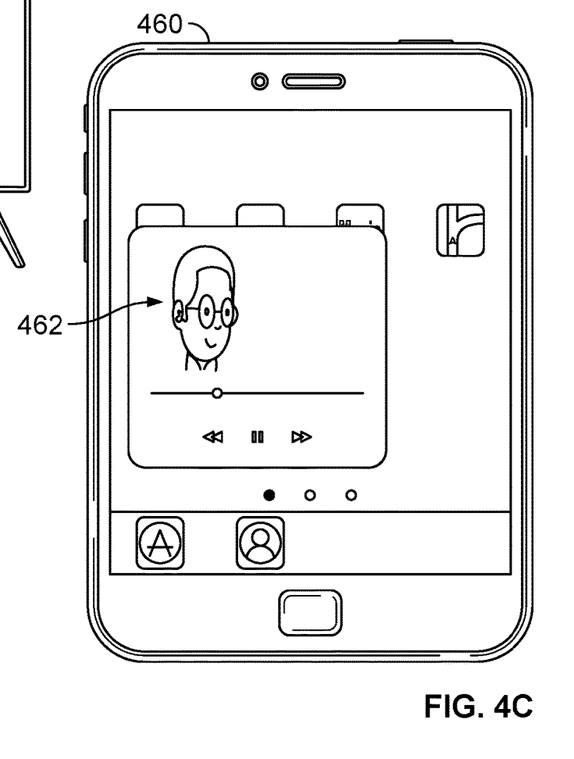

FIGS. 4A-4C illustrate schematic diagrams of example display interfaces for displaying multimedia data stream in accordance with an embodiment of the present disclosure. Those example display interfaces can be implemented at, for example, device 100 of FIG. 1, or system 600 of FIG. 6. Those example display interfaces can also be rendered by process 200 of FIG. 2A, or process 300 of FIG. 3.

FIG. 4A illustrates a scenario where a browser interface 400 is configured to play a multimedia data stream. A transparent area on browser interface 400 is drawn by the browser rendering service along with other interface elements of browser interface 400. Player window 402 (e.g., a multimedia data playing window) is drawn by a multimedia data playing service at a drawing layer other than the one where the transparent area is drawn. Because the player window and the transparent area are drawn in an overlapping manner, a user is presented with visual effects that display the player window, along with other un-occluded interface elements 404 of browser interface 400 (e.g., text block 404, picture block 404, etc.)

FIG. 4B illustrates a scenario where a desktop interface 440 of an IPTV operating system executing on an IPTV device is configured to play a multimedia data stream. As shown herein, when the IPTV operating system is configured to render a desktop thereof, a rendering service of the operating system is configured to draw a transparent area. A multimedia data playing service is configured to draw a player window 442 (e.g., a multimedia data playing window). As shown herein, both the transparent area and player window 442 are configured to occupy the entire IPTV desktop interface 440.

FIG. 4C illustrates a scenario where a desktop interface 460 of a tablet computer is configured to play a multimedia data stream. As shown herein, desktop interface 460 is configured to display a game application (App), which is configured in a player window 462 (e.g., a multimedia data playing window) overlapping a transparent area drawn at desktop interface 460.

Figure 5:
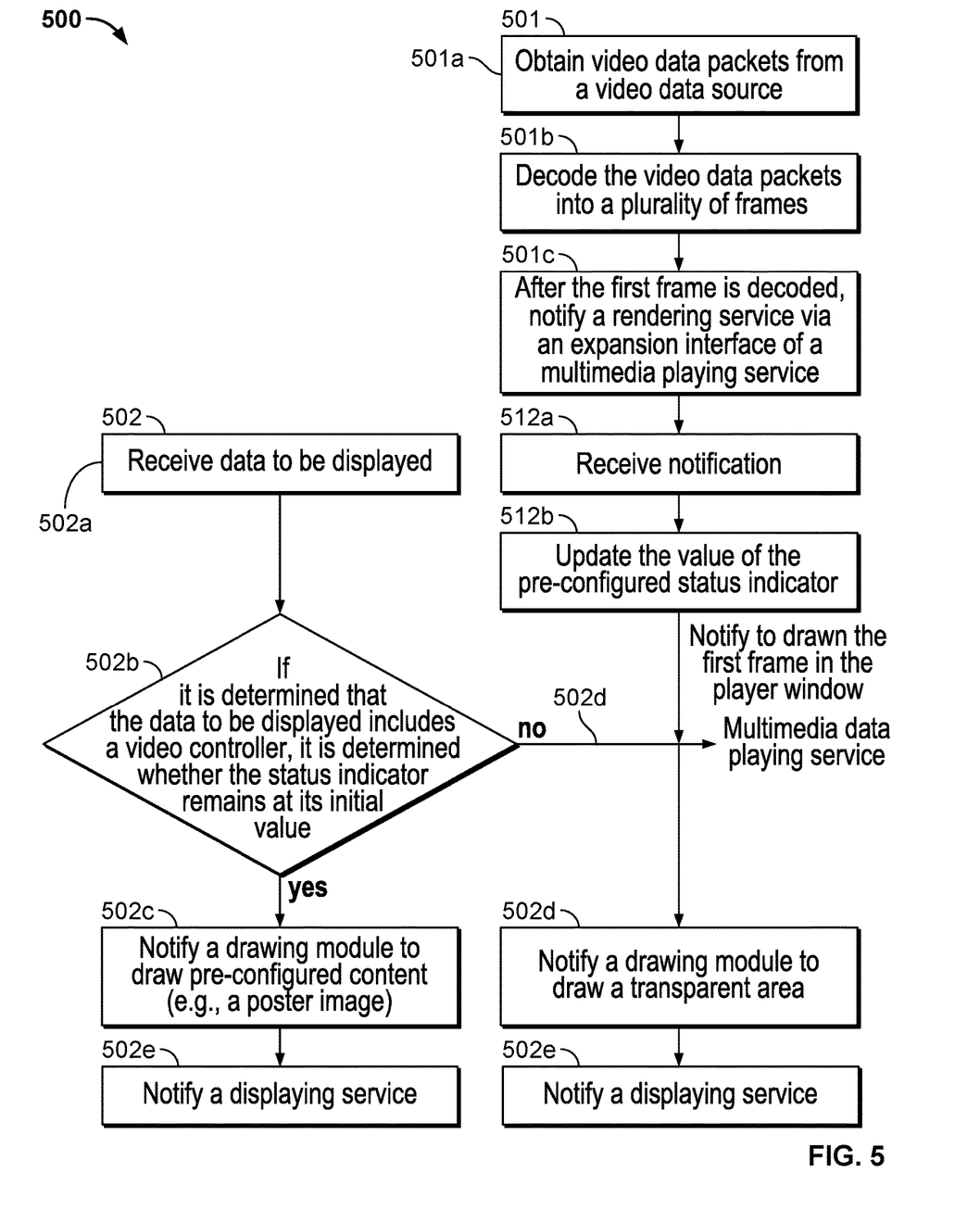
FIG. 5 is a flow chart illustrating an example process for playing video data, in accordance with one or more embodiments of the present disclosure.

FIG. 5 illustrates a flow chart of an example process for playing video data in accordance with an embodiment of the present disclosure. Here, after the first frame associated with the multimedia data is decoded, a transparent area is drawn. Process 500 can be implemented at, for example, device 100 of FIG. 1, or system 600 of FIG. 6.

Process 500 starts at 501, a decoding service is configured to decode the video data. In particular, the decoding service is configured to obtain video data packets from a video data source at 501a, to decode the video data packets into a plurality of frames at 501b. After the first frame is decoded, at 501c, the decoding service is configured to notify a rendering service via an expansion interface of a multimedia playing service. For example, a notification can be formatted as the following:

message type: MSG_INFO_EXT
param1: 306

In this example, "306" indicates that the first frame has been decoded.

At 502, the rendering service is configured to render a display interface. In particular, at 502a, after receiving the data to be displayed at the display interface, the rendering service is configured to determine whether the data includes any video controller. If so, it is determined whether a pre-configured status indicator remains at its initial value. In this case, at 512a, the rendering service is configured to receive a notification from the decoding service. Based on the notification, the rendering service is configured to update the value associated with the pre-configured status indicator at 512b. If the value of the status indicator remains at its initially configured value, it is determined that the first frame has not been decoded. Consequently, at 502c, the rendering service is configured to notify a drawing module to draw a pre-configured content (e.g., a poster image) at the location where the video controller is configured. Otherwise, it is determined that the first frame has been decoded. Consequently, at 502d, the rendering service is configured to notify a multimedia playing service to draw a player window (e.g., a multimedia data playing window) and the first decoded frame in the player window. After either step 502c or 502d is concluded, the multimedia playing service is configured to notify a displaying service to display the drawing results at 502e.

At the displaying stage, the displaying service is configured to display the other rendered interface elements, and the first frame in the player window. The rendering service is configured to notify the displaying service to display the rendering results upon completing the rendering process. On the other hand, the multimedia playing service is configured to notify the displaying service to display the player window after completing the drawing of the player window. Further, the multimedia playing service is configured to notify the displaying service to obtain the first decoded frame for displaying in the player window. Again, prior to the start of playing the video frames, the displaying service is configured to obtain the rendering results of a pre-configured content (e.g., a poster image) for displaying. Once the first frame has been decoded, the displaying service is configured to obtain the rendering results of a transparent area and the rendering results of the player window. The displaying service is configured to display the transparent area and the player window in an overlapping manner, in which each decoded frame displayed accordingly.

Figure 6:
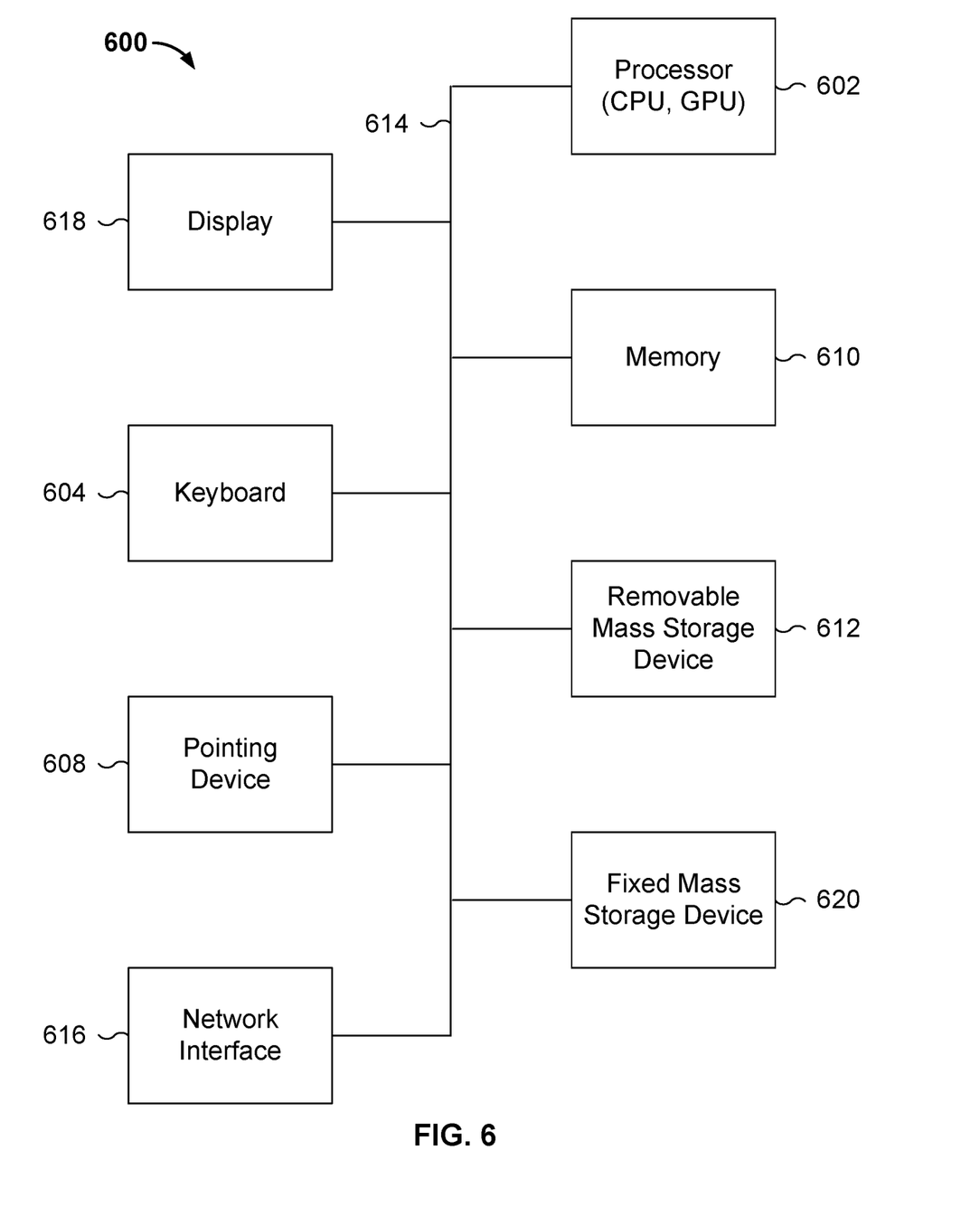
FIG. 6 is a functional diagram illustrating an embodiment of a programmed computer system for processing and displaying multimedia data, in accordance with one or more embodiments of the present disclosure.

FIG. 6 is a functional diagram illustrating an embodiment of a programmed computer system for processing and displaying multimedia data. As will be apparent, other computer system architectures and configurations can be used to process and display multimedia data. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618). In some embodiments, processor 602 includes and/or is used to provide the launch of a client application based on a message.

Processor 602 is coupled bi-directionally with memory 610, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storages can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600 and is coupled either bi-directionally (read/write) or uni-directionally (read only) to processor 602. For example, storage 612 can also include computer readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Mass storage 612, 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers. Persons skilled in the art may clearly understand that, for the sake of descriptive convenience and streamlining, one may refer to the processes in the aforesaid method embodiments that correspond to specific work processes of the systems, devices, and units described above. They will not be discussed further here.

In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media, (transitory media), such as modulated data signals and carrier waves.

A person skilled in the art should understand that embodiments of the present application can be provided as methods, systems, or computer program products. Therefore, the present application can take the form of an entirely hardware embodiment, an entirely software embodiment, or an embodiment that combines software and hardware aspects. In addition, the present application can take the form of computer program products implemented on one or more computer-operable storage media (including but not limited to magnetic disk storage devices, CD-ROMs, and optical storage devices) containing computer operable program codes.

The present application is described with reference to flowcharts and/or block diagrams based on methods, devices (systems), and computer program products of embodiments of the present application. Please note that each process and/or block within the flowcharts and/or block diagrams and combinations of processes and/or blocks within the flowcharts and/or block diagrams can be realized by computer commands. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command devices. These command devices implement the functions specified in one or more processes in a flow chart and/or one or more blocks in a block diagram.

Although preferred embodiments of the present application have already been described, persons skilled in the art can make other alterations and modifications to these embodiments once they grasp the basic creative concept. Therefore, the attached claims are to be interpreted as including the preferred embodiments as well as all alterations and modifications falling within the scope of the present application.

Obviously, a person skilled in the art can modify and vary the present application without departing from the spirit and scope of the present application. Thus, if these modifications to and variations of embodiments of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing multimedia data, comprising:
   determining whether at least one frame associated with the multimedia data has been decoded, wherein the determining whether the at least one frame associated with the multimedia data has been decoded comprises:
      determining, based at least in part on a value associated with a pre-configured status indicator, whether the at least one frame associated with the multimedia data has been decoded; and
      updating the value associated with the pre-configured status indicator upon receiving a notification, wherein the notification is transmitted subsequent to the at least one frame associated with the multimedia data having been decoded;

in response to the determination that the at least one frame associated with the multimedia data has been decoded, drawing a transparent area on a display interface; and instructing a multimedia data playing window and the at least one frame associated with the multimedia data to be drawn, wherein the transparent area and the multimedia data playing window overlap at different drawing layers.

2. The method of claim 1, wherein the at least one frame associated with the multimedia data comprises the first frame of a multimedia data stream.

3. The method of claim 1, further comprising:
drawing pre-determined content on the display interface before the at least one frame associated with the multimedia data is decoded.

4. The method of claim 1, further comprising:
decoding the multimedia data into a plurality of frames; and
transmitting the notification upon the at least one frame associated with the multimedia data having been decoded, the notification indicating that the at least one frame associated with the multimedia data has been decoded.

5. The method of claim 4, wherein the at least one frame associated with the multimedia data comprises the first frame of a multimedia data stream.

6. The method of claim 4, wherein the notification is transmitted via an expansion interface.

7. The method of claim 1, further comprising:
determining that the at least one frame associated with the multimedia data has been decoded based at least in part on the notification; and
displaying the at least one decoded frame associated with the multimedia data in the multimedia data playing window.

8. The method of claim 7, wherein the at least one frame comprises the first frame of a multimedia data stream.

9. The method of claim 7, wherein the notification is transmitted via an expansion interface.

10. The method of claim 7, further comprising:
drawing pre-determined content on the display interface before the at least one frame associated with the multimedia data has been decoded.

11. The method of claim 1, wherein the at least one frame associated with the multimedia data comprises a plurality of frames associated with the multimedia data, a number of the plurality of frames associated with the multimedia data being dynamically determined.

12. A system for processing multimedia data, comprising:
one or more processors configured to:
determine whether at least one frame associated with the multimedia data has been decoded, wherein to determine whether the at least one frame associated with the multimedia data has been decoded comprises to:
determine, based at least in part on a value associated with a pre-configured status indicator, whether the at least one frame associated with the multimedia data having been decoded; and
update the value associated with the pre-configured status indicator upon receiving a notification, wherein the notification is transmitted subsequent to the at least one frame associated with the multimedia data has been decoded;

in response to the determination that the at least one frame associated with the multimedia data has been decoded, draw a transparent area on a display interface; and instruct a multimedia data playing window and the at least one frame associated with the multimedia data to be drawn, wherein the transparent area and the multimedia data playing window overlap at different drawing layers; and one or more memories coupled to the one or more processors, configured to provide the one or more processors with instructions.

13. The system of claim 12, wherein the at least one frame associated with the multimedia data comprises the first frame of a multimedia data stream.

14. The system of claim 12, wherein the one or more processors are further configured to:
decode the multimedia data into a plurality of frames; and
transmit the notification upon the at least one frame associated with the multimedia data having been decoded, the notification indicating that the at least one frame associated with the multimedia data has been decoded.

15. The system of claim 12, wherein the one or more processors are further configured to:
determine that the at least one frame associated with the multimedia data has been decoded based at least in part on the notification; and
display the at least one decoded frame associated with the multimedia data in the multimedia data playing window.

16. A computer program product, the computer program product being embodied in a tangible computer readable storage medium and comprising computer instructions for:
determining whether at least one frame associated with a multimedia data has been decoded, wherein the determining whether the at least one frame associated with the multimedia data has been decoded comprises:
determining, based at least in part on a value associated with a pre-configured status indicator, whether the at least one frame associated with the multimedia data has been decoded; and
updating the value associated with the pre-configured status indicator upon receiving a notification, wherein the notification is transmitted subsequent to the at least one frame associated with the multimedia data having been decoded;

in response to the determination that the at least one frame associated with the multimedia data has been decoded, drawing a transparent area on a display interface; and instructing a multimedia data playing window and the at least one frame associated with the multimedia data to be drawn, wherein the transparent area and the multimedia data playing window overlap at different drawing layers.

17. The system of claim 12, wherein the one or more processors are further configured to:
draw pre-determined content on the display interface before the at least one frame associated with the multimedia data is decoded.

18. The computer program product of claim 16, further comprising:
drawing pre-determined content on the display interface before the at least one frame associated with the multimedia data is decoded.

19. A method for processing multimedia data, comprising:
  determining whether at least one frame associated with the multimedia data has been decoded;
  determining that the at least one frame associated with the multimedia data has been decoded based at least in part on a notification, the notification being transmitted after the at least one frame associated with the multimedia data has been decoded, wherein the determining that the at least one frame associated with the multimedia data has been decoded comprises:
    updating a value associated with a pre-configured status indicator based at least in part on the notification; and
    determining, based at least in part on the value associated with the pre-configured status indicator, whether the at least one frame associated with the multimedia data has been decoded;
  in response to the determination that the at least one frame associated with the multimedia data has been decoded, drawing a transparent area on a display interface; and
  instructing a multimedia data playing window and the at least one frame associated with the multimedia data to be drawn, wherein the transparent area and the multimedia data playing window overlap at different drawing layers.

20. A system for processing multimedia data, comprising:
  one or more processors configured to:
    determine whether at least one frame associated with the multimedia data has been decoded;
    determine that the at least one frame associated with the multimedia data has been decoded based at least in part on a notification, the notification being transmitted after the at least one frame associated with the multimedia data has been decoded, wherein to determine that the at least one frame associated with the multimedia data has been decoded comprises to:
      update a value associated with a pre-configured status indicator based at least in part on the notification; and
      determine, based at least in part on the value associated with the pre-configured status indicator, whether the at least one frame associated with the multimedia data has been decoded;
    in response to the determination that the at least one frame associated with the multimedia data has been decoded, draw a transparent area on a display interface; and
    instruct a multimedia data playing window and the at least one frame associated with the multimedia data to be drawn, wherein the transparent area and the multimedia data playing window overlap at different drawing layers; and
  one or more memories coupled to the one or more processors, configured to provide the one or more processors with instructions.

* * * * *